United States Patent [19]

van der Lely et al.

[11] 3,942,267

[45] Mar. 9, 1976

[54] CROP TREATMENT DEVICES

[76] Inventors: Ary van der Lely, 10, Weverakade, Maasland; Cornelis Johannes Gerardus Bom, 36, Esdoornlaan, Rozenburg, both of Netherlands

[22] Filed: May 28, 1974

[21] Appl. No.: 473,571

[30] Foreign Application Priority Data

May 28, 1973 Netherlands ........................ 7307375

[52] U.S. Cl. .................. 34/236; 198/101; 214/17 C; 214/17 CA; 214/17 D

[51] Int. Cl.$^2$ ..................... B65G 65/30; F26B 15/18

[58] Field of Search ........... 214/17 R, 17 C, 17 CA, 214/17 D; 198/88, 89, 101, 126; 34/224, 233, 236

[56] References Cited

UNITED STATES PATENTS

| | | | |
|---|---|---|---|
| 3,125,231 | 3/1964 | Mortland | 214/17 C X |
| 3,736,670 | 6/1973 | van der Lely | 34/236 X |

*Primary Examiner*—Robert G. Sheridan
*Attorney, Agent, or Firm*—Mason, Mason & Albright

[57] ABSTRACT

A crop drier has an enclosed drying chamber with an entrance at the front thereof and an exit adjacent the back thereof. A conveyor system includes a floor conveyor for receiving long stemmed crop and conveying it to a lifting conveyor which drops the crop on a lower transverse conveyor at the rear of the chamber. The lifting conveyor is configured as a right angled triangle that lifts and drops crop on an elevator conveyor at one side of the chamber. The latter conveyor then moves the crop to an upper transverse conveyor at the top of the chamber near the front thereof.

The upper conveyor is structured to reciprocate within the chamber across its width while continuously receiving crop from the elevator conveyor. The upper conveyor has an endless chain with an upper and a lower run and while an endless belt is moving and dropping crop to the floor conveyor a reversing mechanism is cycled to reciprocate the upper conveyor, or a surface associated with the conveyor, and ensure that the crop is distributed uniformly across the entire width of the chamber.

A safety cut off device is mounted adjacent the juncture of the elevator and lower transverse conveyors to stop the latter's movement and that of the floor conveyor is an excess of crop is loaded on the elevator conveyor. A blower and heating plant are connected by ducts to the chamber and once the crop has been dried satisfactorily, the crop can be directed by the upper conveyor to a branch duct via a funnel so that the blower can then move the dried crop to a collection area.

81 Claims, 12 Drawing Figures

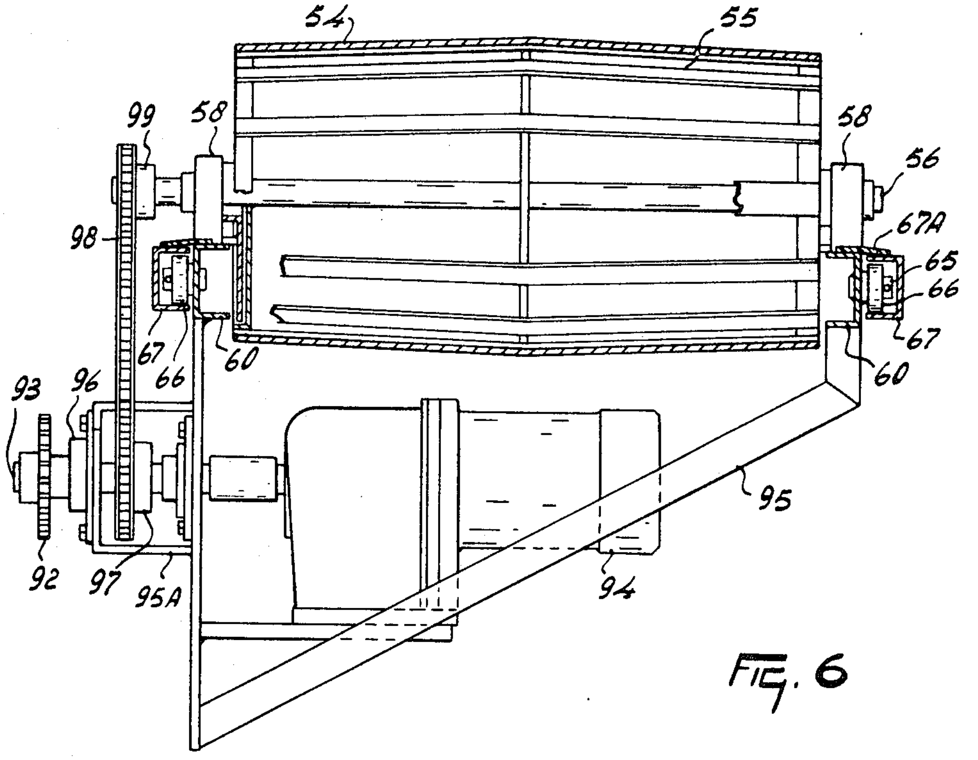
FIG. 6
FIG. 8
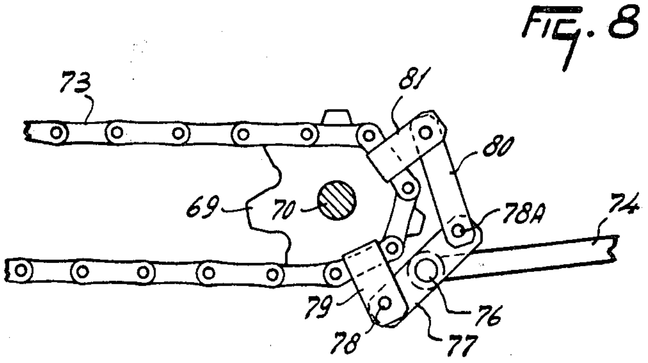

CROP TREATMENT DEVICES

SUMMARY OF THE INVENTION

According to the invention, there is provided a crop treatment device of the kind set forth, wherein the conveying mechanism includes means for supplying crop to a region at or near said one end of the chamber in such a way that the crop will be substantially uniformly distributed throughout substantially the whole of the effective width of said chamber in that region.

BRIEF DESCRIPTION OF THE DRAWINGS

For a better understanding of the invention, and to show how the same may be carried into effect, reference will now be made, by way of example, to the accompanying drawings, in which:

FIG. 6 is a section, to an enlarged scale, taken on the line VI—VI of FIG. 5, FIG. 8 is an elevation, to an enlarged scale, illustrating parts for altering the direction of movement of the conveyor of FIG. 5 in greater detail.

DESCRIPTION OF THE PREFERRED EMBODIMENTS

Figure 1:
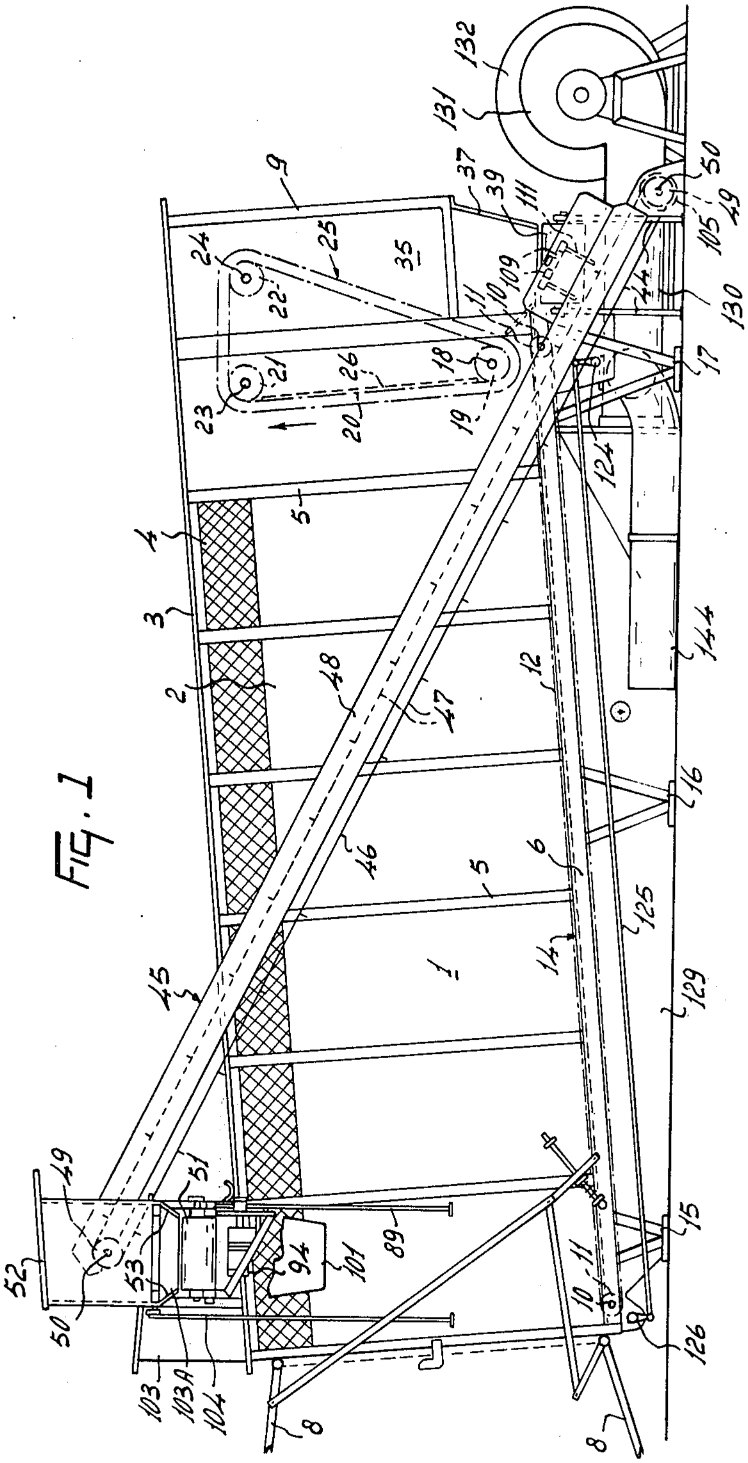
FIG. 1 is a diagrammatic side elevation of a crop treatment device in accordance with the invention.

Referring to the drawings, the crop treatment device that is illustrated therein is intended primarily, but not exclusively, for the drying of crop and is particularly, but not exclusively, suitable for dealing with long-stemmed crops. The device comprises a drying chamber 1 into which the long-stemmed or other crop can be introduced and it will be seen from FIGS. 1 and 2 of the drawings that said chamber 1 has a length which is considerably greater than its width, said chamber comprising substantially vertical side walls 2 formed from metal or other sheet material, the uppermost edges of the side walls 2 being interconnected throughout major parts of their lengths by a roof 3. The greater part of the length of an upper portion of each side wall 2 is of open formation and is covered by metal mesh or gauze 4. Air that has been passed through crop to dry the same escapes to the atmosphere through the apertures in the mesh or gauze 3.

Figure 5:
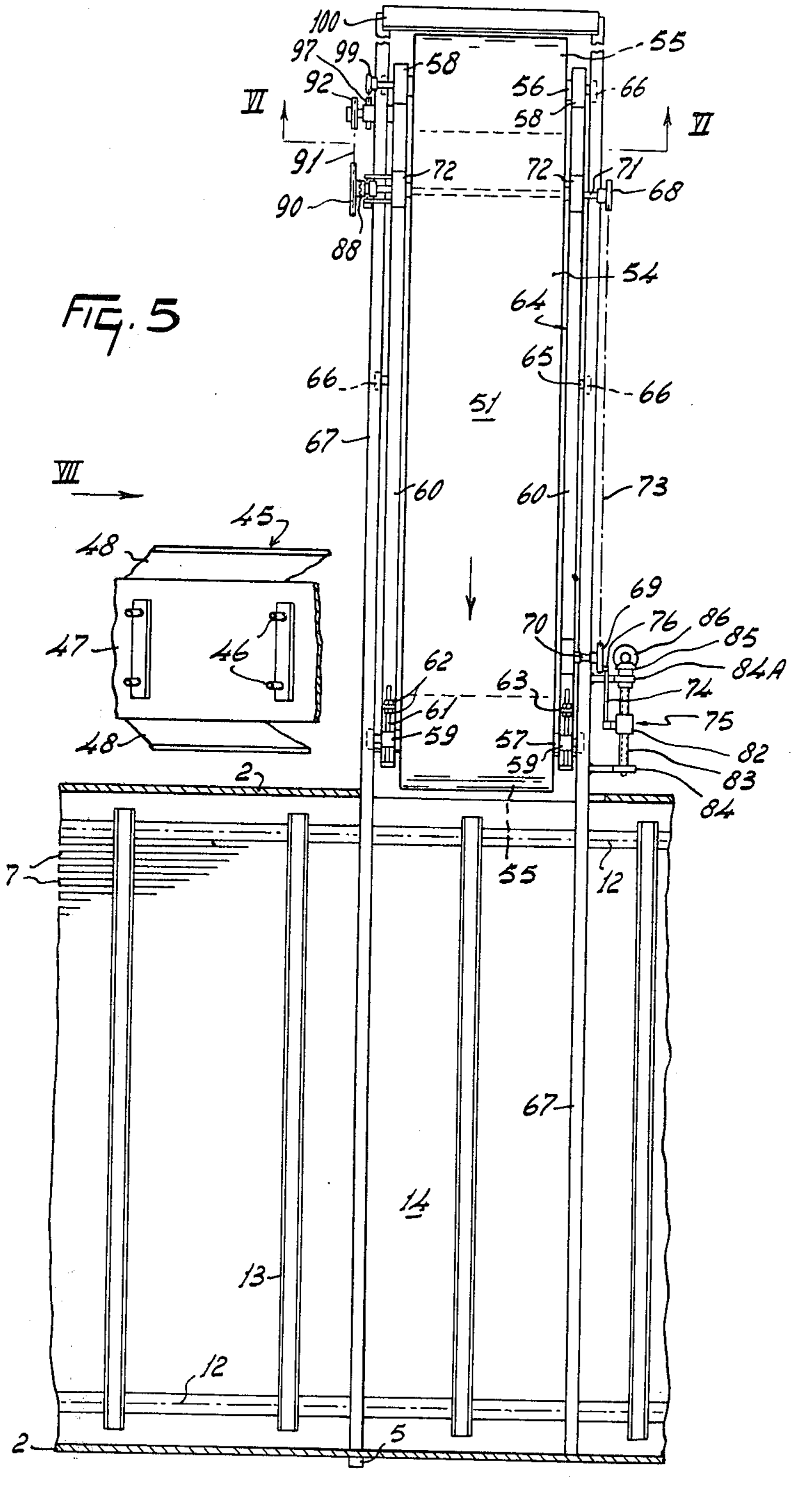
FIG. 5 is a plan view, to an enlarged scale, illustrating the construction and arrangement of a conveyor that can reciprocate across a chamber of the device.

Beams 6 extend lengthwise of the chamber 1 at the lower edges of the two side walls 2 and beams 5 extend perpendicularly upwardly from said beams 6 at regular intervals therealong to increase the rigidity of the side walls 2, said beams 5 being disposed in pairs, one at each lateral side of the chamber 1. Beams that are not visible in the drawings also extend transversely between the beams 6 at regular intervals along the latter beams to form a support for a slotted floor of the chamber that is in the form of a plurality of parallel, but spaced apart, elongated elements 7 (FIG. 5). A crop-receiving end of the chamber 1 is provided with pivotally mounted flaps or doors 8 that are turnable around substantially horizontal hinges to open or close said end, as required. The crop-receiving end of the chamber 1 that is provided with the flaps or doors 8 will hereinafter be considered as being the "front" of the chamber 1. The rear end of the chamber 1 is provided with an upright wall 9 which is, however, located at a distance behind the rearmost end of the floor of the chamber 1. The lowermost edge of said upright rear wall 9 is disposed at a higher horizontal level than the rearmost end of the floor of the chamber 1.

Horizontal shafts 10 that are rotatably mounted in bearings carried by the beams 6 at the opposite lateral sides of the floor of the chamber 1 are arranged close to the front and rear ends of that floor, said shafts 10 extending parallel to each other and perpendicular to the length of the chamber floor. Two sprocket wheels 11 are mounted on each of the shafts 10 near to, but spaced from, the side walls 2 and two chains 12 each extend around one sprocket wheel 11 on one shaft 10 and one sprocket wheel 11 on the other shaft 10. The two chains 12 are interconnected at regular intervals by beams 13 of channel-shaped cross-section, said beams 13 extending perpendicular to the length of the chamber 1. An endless conveyor 14 (FIG. 5) is thus formed, the upper run thereof being disposed immediately above the slotted floor of the chamber 1 so that it can co-operate with that floor during the use of the device. It will already have been noted from FIGS. 1 and 2 of the drawings that the floor of the chamber 1 is inclined upwardly from the front to the rear thereof at a few degrees to the horizontal. The beams 6 that extend longitudinally of said floor at opposite sides thereof are supported from the ground by leg assemblies 15, 16 and 17 that are of increasing height from the front to the rear of the chamber 1.

A horizontal shaft 18 that extends parallel to the shafts 10 is arranged a short distance above the rear end of the conveyor 14 between bearings carried by the side walls 2. The shaft 18 carries sprocket wheels 19 at locations close to, but spaced from, the side walls 2 and chains 20 extend around said sprocket wheels 19 and also around further sprocket wheels 21 and 22 carried by shafts 23 and 24 respectively that are both parallel to the shaft 18. The shafts 23 and 24 are arranged towards the upper edges of the side walls 2 at approximately the same horizontal level in such a way that, as seen in side elevation (FIG. 1 or FIG. 2) the shafts 18, 23 and 24 are at the three corners of a right-angled triangle. The shortest "adjacent" side of this triangle is uppermost and is subsantially horizontally disposed. The chains 20 form parts of an endless conveyor 25 of which further details will be given below. The front or "opposite" side of the triangular (in side elevation)

conveyor 25 extends substantially perpendicular to the floor and roof 3 of the chamber 1 and parallel to the beams 5. A flat plate 26 is arranged immediately to the rear of the front side of the conveyor 25 that has just been mentioned in parallel relationship therewith.

Figure 3:
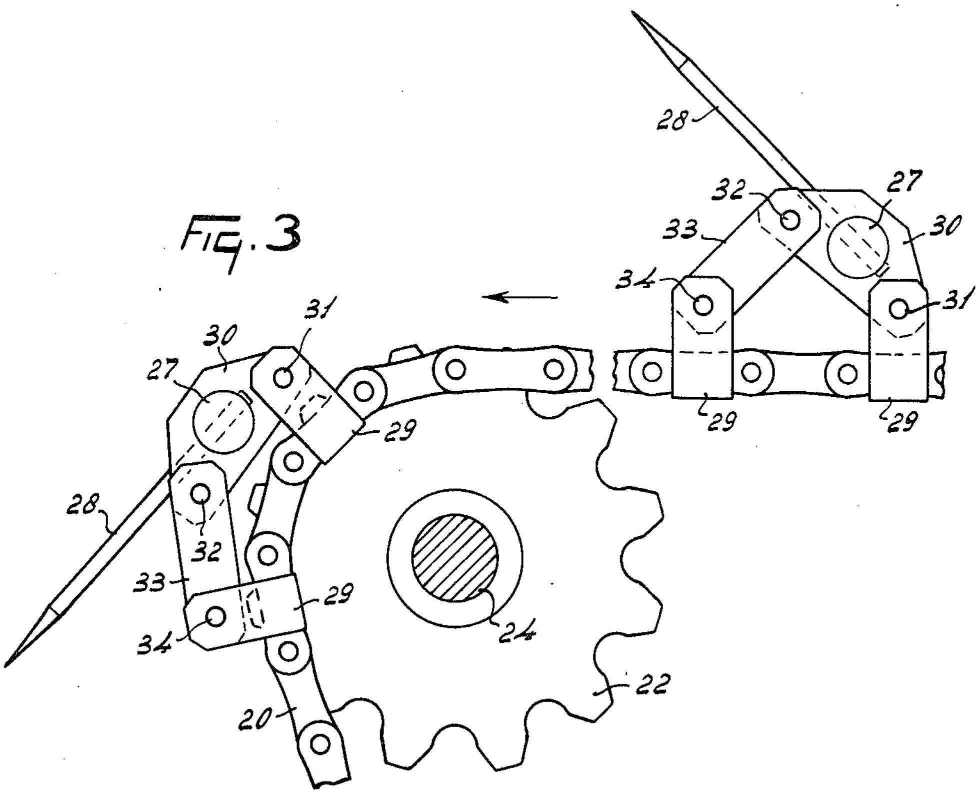
FIG. 3 is a broken elevation, to an enlarged scale, illustrating the construction and mounting of crop displacement tines of the device.

FIG. 3 of the drawings shows further details of the conveyor 25 and it will be seen therefrom that tine supports 27 are indirectly connected to the two chains 20 at regular intervals therealong, each tine support 27 carrying a row of straight pointed tines 28 that are generally forwardly directed with respect to the intended direction of operative travel of the conveyor 25 that is indicated by an arrow in FIG. 3 of the drawings. Each tine support 27 is provided at its opposite ends with plates 30 and these plates 30 are directly connected by pivot pins 31 to brackets 29 that are behind said supports 27 with respect to the intended direction of operative movement of the conveyor 25, said brackets 29 being fixedly secured to corresponding links of the two chains 20. The plates 30 are also pivotally connected by pins 32 to the ends of links 33 whose opposite ends in turn, are pivotally connected by pins 34 to further brackets 29 that are also fixedly secured to the links of the chains 20 but that are disposed forwardly of the tine supports 27 with respect to the intended direction of operative movement of the conveyor 25. This pivotally mounted arrangement of the tine supports 27 has the advantage that, where the conveyor chains 20 move around the sprocket wheels 19, 21 and 22, the tines 28 maintain dispositions in which they will be effective in engaging and carrying along with them any crop which they may encounter and will not tend to shed prematurely any crop that they may already be transporting. The endless conveyor 25 extends throughout substantially the whole of the effective width of the chamber 1 and constitutes a discharge or dosing mechanism 35 by which crop carried to the rear of the chamber 1 by the conveyor 14 can be supplied from that chamber in a regular manner during the use of the device.

A horizontally disposed endless conveyor 36 extends perpendicular to the length of the chamber 1 at a location more or less vertically beneath the uppermost and rearmost region of the endless conveyor 25. The endless conveyor 36 has a width which is substantially equal to the distance between the rear wall 9 of the chamber 1 and the rearmost end of the floor of that chamber. The lower edge of the rear wall 9 of the chamber 1 is provided with a downardly inclined guide 37 that is directed towards the rearmost edge of the upper run of the conveyor 36, said guide 37 being connected at one of its ends to a transverse wall 38 that is, in turn, joined to one of the side walls 2 of the chamber 1. It can be seen from FIG. 4 of the drawings that the conveyor 36 extends beyond the chamber 1 at the side thereof that is remote from the transverse wall 38. The conveyor 36 comprises an endless belt 39 that is guided around rollers 40 carried by stub shafts 41 mounted in a supporting structure 42. The supporting structure 42 comprises two beams 43 that extend substantially perpendicular to the length of the chamber 1 and that are sustained near their ends by uprights 44. It will also be noted from FIG. 4 of the drawings that the guide 37 projects from the chamber 1 at the same side as the endless conveyor 36 throughout a greater distance than the projection of that endless conveyor. The projecting end of the conveyor 36 is located above a lower receiving end of a crop elevator 45 which elevator is inclined upwardly against one side wall 2 of the chamber 1 from substantially the rear to substantially the front of that chamber. The crop elevator 45 comprises an endless belt 47 provided with regularly spaced apart tines or teeth 46, the upper effective run of the belt 47 being disposed between two upwardly divergent sidewalls 48. The belt 47 moves around rollers 49 carried by stub shafts 50 located near the ends of a support to which the upwardly divergent side walls 48 are secured.

The uppermost delivery end of the elevator 45 is located above an endless conveyor 51 which extends substantially perpendicular to the length of the chamber 1 beneath a housing 52 whose walls comprise lower downwardly convergent portions 53 that terminate immediately above the upper run of the conveyor 51. The conveyor 51 comprises an endless belt 54 (FIGS. 5 and 6 of the drawings) which is guided around rollers 55 journalled by corresponding shafts 56 and 57 in bearings 58 and 59 respectively. The bearings 58 and 59 are carried by beams 60 of channel-shaped cross-section that extend parallel to the conveyor 51 at opposite sides thereof. Each of the bearings 59 is provided with a transverse screwthreaded hole which receives a corresponding pin 61. Lugs 63 project from the beams 60 and the pins 61, which are also screwthreaded, are entered through holes in said lugs 63 and are provided with nuts 62 at opposite sides of said lugs. The nuts 62 fix the pins 61 in position relative to the beams 60 which thus constitute a supporting structure 64 for the conveyor 51. The beams 60 are provided, near their opposite ends and close to their midpoints, with stub shafts 65 on which rollers 66 are mounted in a freely rotatable manner. The rollers 66 are received between the limbs of guides 67 of channel-shaped cross-section, said guides 67 extending perpendicular to the length of the chamber 1.

Figure 7:
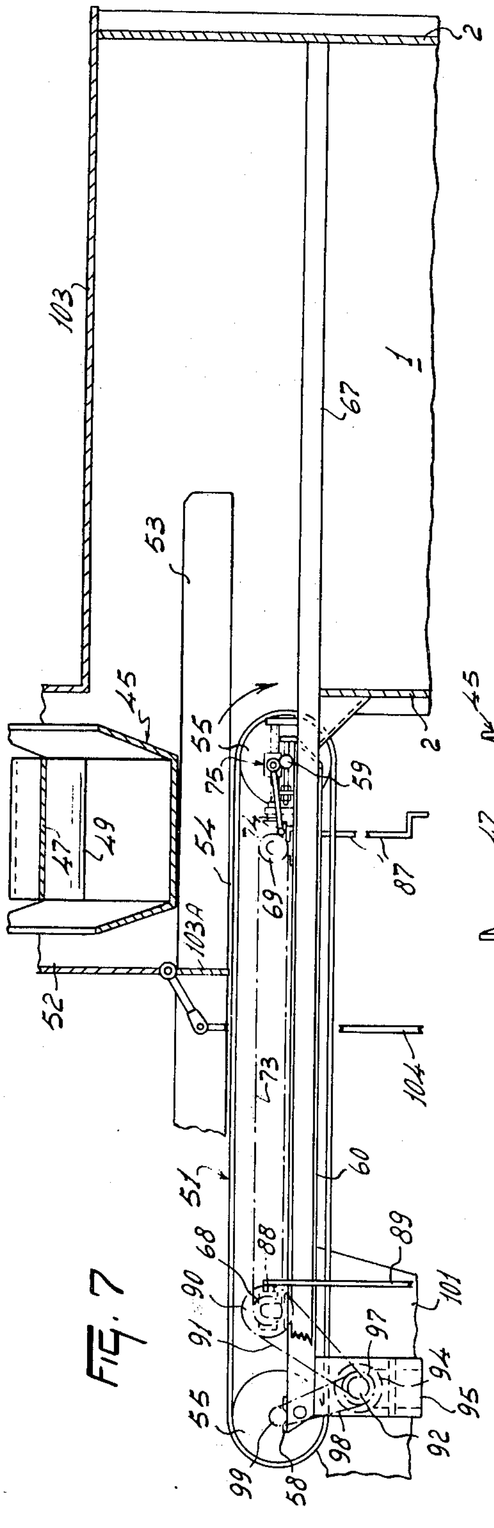
FIG. 7 is a view as seen in the direction indicated by an arrow VII in FIG. 5.

It can be seen from FIGS. 5 and 7 of the drawings that the guides 67 are mounted above the top of the chamber 1, a gap that exists between the beams 60 and said guides 67 being covered by a screening strip 67A (FIG. 6). The guides 67 border a rectangular opening in the roof of the chamber 1 that extends throughout the whole of the width of that chamber. The length (i.e. transversely of the chamber roof 3) is substantially the same as the length of the conveyor 51 in the intended direction of operative movement thereof that is indicated by an arrow in FIG. 5 of the drawings. Sprocket wheels 68 and 69 are located alongside one of the beams 60 of the supporting structure 64 for the conveyor 51 at substantially equal distances from the bearings 58 and 59. The sprocket wheel 69 that is closest to the chamber 1 is freely rotatable on a stub shaft 70 whereas the sprocket wheel 68 is secured to a shaft 71 rotatably mounted in bearings 72 which are carried by the two beams 60 at positions such that said shaft 71 lies between the upper and lower runs of the belt 54 of the conveyor 51. A transmission chain 73 extends around the sprocket wheels 68 and 69, one location on said chain 73 being secured to the neighboring guide 67 by being pivotally connected to an operating arm 74 of a reversing mechanism 75 that is mounted on top of the guide 67 concerned near one of the side walls 2 of the chamber 1. One end of the operating arm 74 of the reversing mechanism 75 is turnably connected by a pivot 76 (FIG. 8) to the midpoint of a link 77 whose opposite ends are turnably connected by further pivots 78 and 78A to a bracket 79 and a further link 80 respectively. The bracket 79 is rigidly carried by one of the links of the chain 73 and the end of the strip-like link 80 that is remote from the pivot 78A is turnably connected by a further parallel pivot to a bracket 81 fixedly secured to a link of the chain 73 that is one link removed from the one thereof that carries the bracket 79. The end of the operating arm 74 of the reversing mechanism 75 that is remote from the pivot 76 is pivotally connected to a travelling block 82 that is mounted, by way of a screwthreaded bore, on a screwthreaded shaft 83 having opposite end regions that are rotatably received in brackets 84 and 84A that project from the side of the adjacent guide 67. The end of the screwthreaded rod 83 that is close to the bracket 84A carries a bevel pinion 85 whose teeth are in mesh with those of a bevel pinion 86 carried at the uppermost end of the shank of a downwardly extending cranked spindle 87 (FIG. 7). It will be evident that the position of the travelling block 82 lengthwise of the screwthreaded rod 83 can be changed by rotating the cranked spindle 87 manually in the required direction. Such adjustment, it will be noted, changes the point at which the chain 73 is fixed relative to the neighboring guide 67.

The shaft 71 to which the sprocket wheel 68 is secured also carries, at the end thereof remote from said sprocket wheel 68, a toothed coupling 88 having a downwardly directed control member 89 (FIG. 7) which is operable to provide drive to the shaft 71 or to withhold drive therefrom. A sprocket wheel 90 is also carried by the shaft 71 immediately beyond the toothed coupling 88 and this sprocket wheel 90 is coupled by a transmission chain 91 to a sprocket wheel 92 secured to the output shaft 93 of an electric motor 94 carried by a beam 95 (FIG. 6) in a lower region of the supporting structure 64. The output shaft 93 of the electric motor 94 is rotatably received in a bearing 96 carried by a bracket 95A that also forms part of the supporting structure 64. The output shaft 93 is provided, inside the bracket 95A, with a sprocket wheel 97 which is coupled by a transmission chain 98 to a sprocket wheel 99 at one end of the central shaft 56 of one of the supporting rollers 55 of the endless belt 54 of the conveyor 51.

Figure 9:
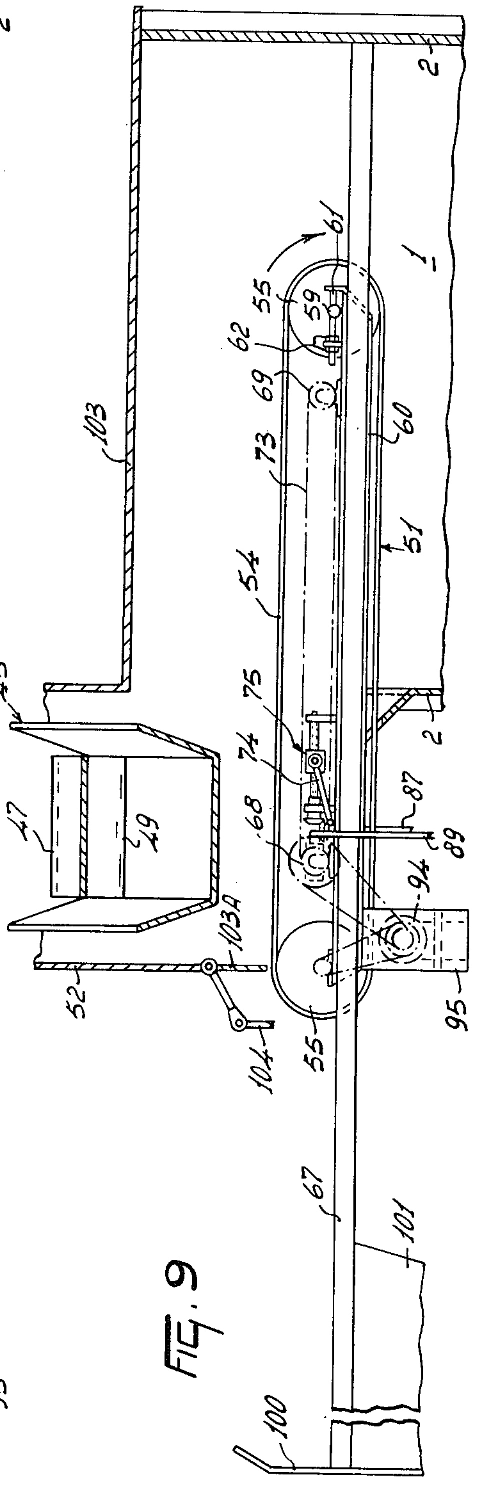
FIG. 9 is a similar view to FIG. 7 but shows an alternative position of the conveyor in which it is located partially within the chamber of the device.

The ends of the two guides 67 that are remote from the drying chamber 1 are interconnected by a vertical or substantially vertical plate 100 having an uppermost edge region that is bent over through a few degrees towards the conveyor 51 (see FIG. 9), a funnel 101 being provided beneath the two guides 67 alongside the plate 100. The housing 52 that surrounds the upper delivery end of the elevator 45 adjoins a further housing 103 which is arranged above an opening in the roof 3 of the chamber 1. The walls of the housing 103 that extend lengthwise of the chamber 1 carry the downwardly convergent portions 53 that guide crop downwardly from the housing 52 onto the upper run of the immediately underlying conveyor 51. The wall of the housing 52 that is farthest remote from the chamber 1 is provided at its bottom with a pivotable flap 103A (FIGS. 1 and 10) that extends downwardly to a location immediately above the uppermost run of the belt 54 of the conveyor 51. A control rod 104 extends downwardly from the flap 103A and is operable to change the angular position of said flap (compare FIGS. 10 and 11 of the drawings). The lower roller 49 of the elevator 45 has one of its stub shafts 50 in driven communication with the output shaft of an electric motor 105 (FIG. 4) and a safety mechanism 106 is arranged quite close to said lower roller 49. The safety mechanism 106 is arranged to discontinue drive to the endless conveyor 25 of the discharge or dosing mechanism 35 and to the endless conveyor 36 in the event of too much crop per unit time being fed thereto from the interior of the chamber 1. The safety mechanism 106 comprises a pair of supports 108 projecting from an upright plate 107 carried by one of the side walls 48 of the elevator 45. The ends of the supports 108 that are remote from the plate 107 carry aligned sleeves 109 in which a shaft 110 is turnably received. The opposite ends of the shaft 110 carry downwardly extending substantially parallel rods or bars 111 whose lowermost ends are bent over to some extent towards the neighboring end of the conveyor 36. The shaft 110 is provided between the sleeves 109 with a projection 112 which can co-operate with an operating member 113 of a switch 114 that is carried by said sleeves 109. Actuation of the operating member 113 will cause the switch 114 to stop the drive to the conveyors 25 and 36.

The shaft 23 of the conveyor 25 has an end that projects through one of the side walls 2 and that end is provided with a sprocket wheel 115 (FIG. 2) that is coupled by a transmission chain 116 to a sprocket wheel 117 mounted on a shaft 118 located beneath the floor of the chamber 1. An electric motor 119 drives the shaft 118 through the intermediary of a gear box that is not shown in the drawings. The shaft 23 is also provided with a coupling member 120 having a downwardly extending control rod 121 that can be operated to cause said shaft 23 to be driven or to withhold drive therefrom. The electric motor 119 also drives one of the stub shafts 41 at one end of one of the rollers 40 of the endless conveyor 36, said drive being effected by way of a shaft 122 (FIG. 2) that extends perpendicular to the length of the chamber 1, sprocket wheels and an interconnecting transmission chain 123. It will be evident that it is the electric motor 119 that is controlled by the switch 114. The opposite end of the shaft 122 drives a pawl and ratchet wheel mechanism 124 (FIG. 1) whose construction is known per se, the output of said mechanism 124 being connected by a long rod 125 to a second similar pawl and ratchet wheel mechanism 126 that operates an auger 128 (FIG. 2) located in a collecting trough 127 immediately beneath the floor of the chamber 1 at the front of the latter. Dust and the like tends to accumulate in the trough 127 and is slowly but continuously removed from that location by the auger 128 during the use of the device.

An air chamber 129 is provided beneath the floor of the drying chamber 1, said chamber 129 being of irregular quadrilateral configuration as seen in side elevation and the rear end of said chamber being in communication with a duct 130 through which passes air from a blower 131 during the use of the device, said blower 131 being provided with a heating system 132 comprising at least one burner producing hot air and/or hot combustion gases that can be fed by said blower 131 through the duct 130 into the air chamber 129. It will be apparent from FIG. 2 of the drawings that the walls of the air chamber 129 are inclined outwardly away from their junction with the duct 130 so that a satisfactory supply of air throughout the chamber 129 is ensured. Air and/or combustion gases that are fed to the chamber 129 pass upwardly into the drying chamber 1 through the slot-like apertures between the elongated elements 7 and through the open formation endless conveyor 14. The drying air then passes through and over crop contained within the chamber 1 and finally escapes back to the atmosphere through the mesh or gauze 4 in the upper regions of the side walls 2.

Figure 2:
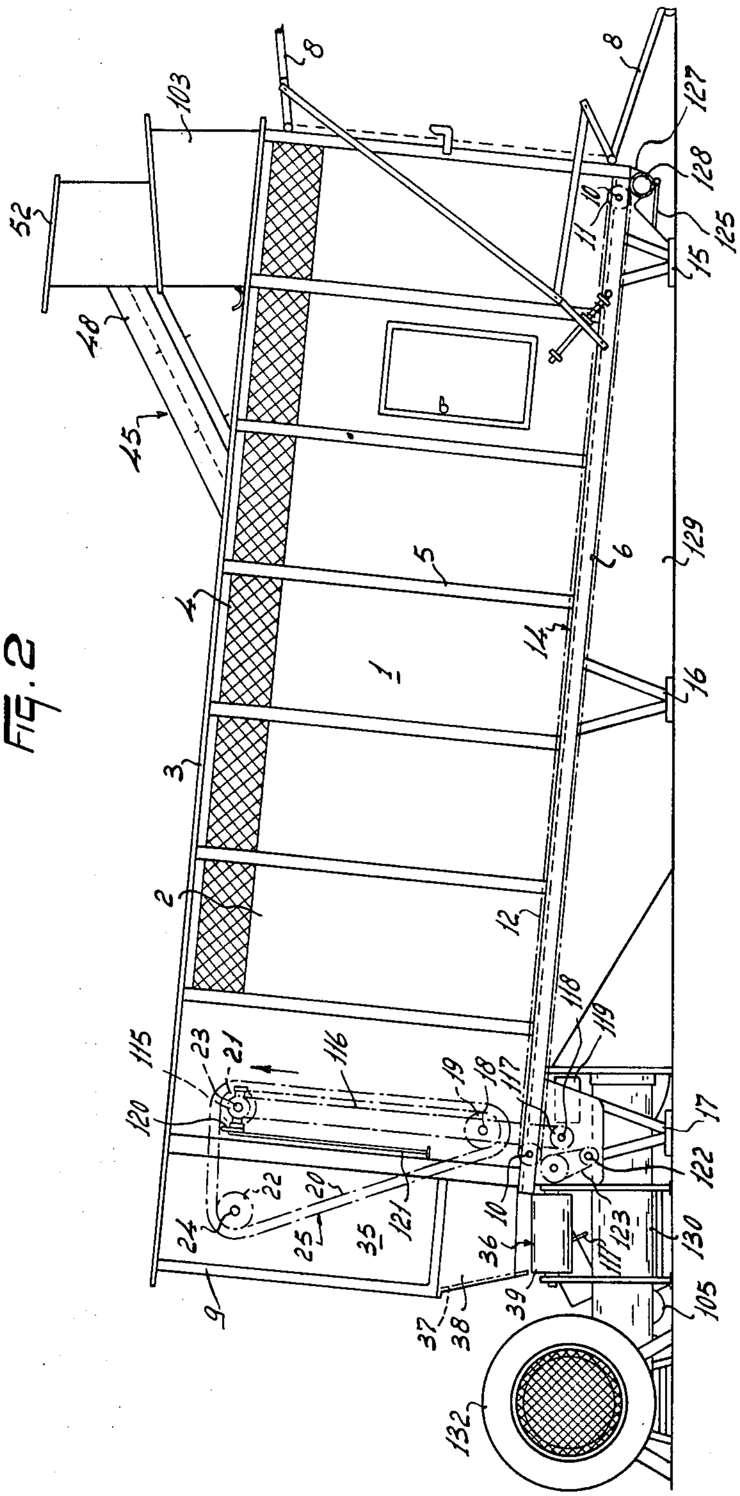
FIG. 2 is a similar opposite side elevation of the device of FIG. 1.
Figure 4:
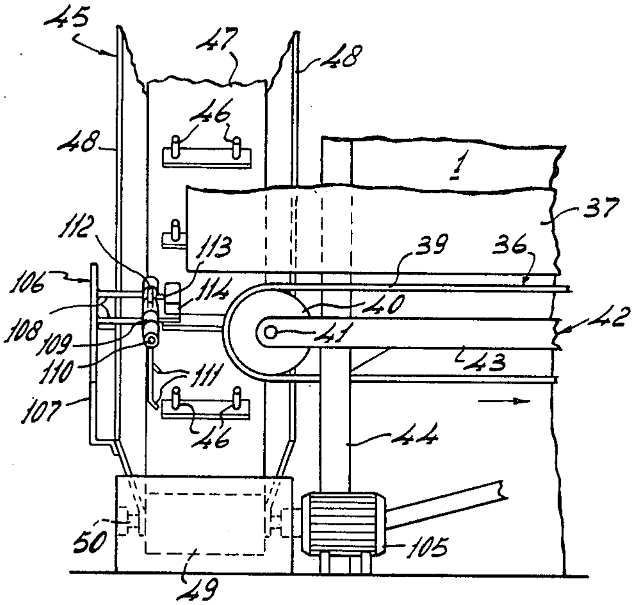
FIG. 4 is an elevation, to an enlarged scale, illustrating lower parts of an elevator of the device and a safety mechanism that is associated therewith.

In the use of the crop treatment device which has been desribed, a load of long-stemmed or other crop is introduced into the chamber 1 from the front thereof by a crop pick-up trailer, wagon or other crop collection and/or delivery vehicle. The lower hinged flap or door 8 can serve as a ramp to assist in such a delivery of crop to the chamber 1 when it is disposed in the open position that can be seen best in FIG. 2 of the drawings. It is usually possible for the rear or delivery end of the crop pick-up trailer, wagon or other vehicle to be maneuvered into the mouth that is afforded by the open front of the chamber 1. Crop discharged from the vehicle falls first onto the front end of the conveyor 14 and this conveyor is accordingly driven from the electric motor 119 at a controllable speed in a manner that is not illustrated in the drawings by way of a further pawl and ratchet wheel mechanism of a kind that is known per se. The upper run of the conveyor 14 is thus caused to move slowly but continuously through the chamber 1 from the front to the rear thereof. The control rod 121 is manipulated to place the coupling member 120 in an ineffective setting at this time so that the conveyor 25 is not driven. When the chamber 1 is wholly or partly filled with crop that is to be dried, the flaps or doors 8 are brought to a closed position and the coupling member 120 is reset to cause the conveyor 25 to be driven. The conveyor 25 moves in the direction of the arrows that are shown in FIGS. 1, 2 and 3 of the drawings and the successive rows of tines 28 that move upwardly in front of the plate 26 carry away small quantities of the crop from the bulk supply within the chamber 1 in a continuous and regular manner. Drive is maintained to the conveyor 14 so that the bulk supply within the chamber 1 is continually urged towards the upwardly moving tines 28. The small quantities of crop tend to fall off the tines 28 as said tines move downwardly through the rearmost run of the conveyor 25 at the "hypotenuse" side of the substantially right-angled triangle that has been discussed above, said straight tines 28 being substantially vertically disposed when in that run of the conveyor 25. The crop that falls off the tines 28 drops downwardly onto the transversely extending conveyor 36, the guide 37 acting to ensure that the crop is directed correctly onto the conveyor 36. The endless belt 39 of the conveyor 36 moves in the direction indicated by an arrow in FIG. 4 of the drawings and thus carries crop which it receives laterally out of the chamber 1 and discharges it onto the underlying lower receiving end of the elevator 45. If too much crop is fed from the conveyor 36 at any time, that excess crop will push the rods or bars 111 in a clockwise direction as seen in FIG. 4 of the drawings about the axis of the shaft 110 thus causing the projection 112 to contact the operating member 113 and open the circuit through the switch 114. If this happens, the conveyor 25 and the conveyor 36 both cease to move until the blockage has been automatically cleared by the elevator 45 which continues to function. As soon as the excess quantity of crop has been removed by the elevator 45, the rods or bars 111 can move back to their normal position, substantially as shown in FIG. 4 of the drawings, whereupon drive to the conveyors 25 and 36 automatically recommences.

Figure 10:
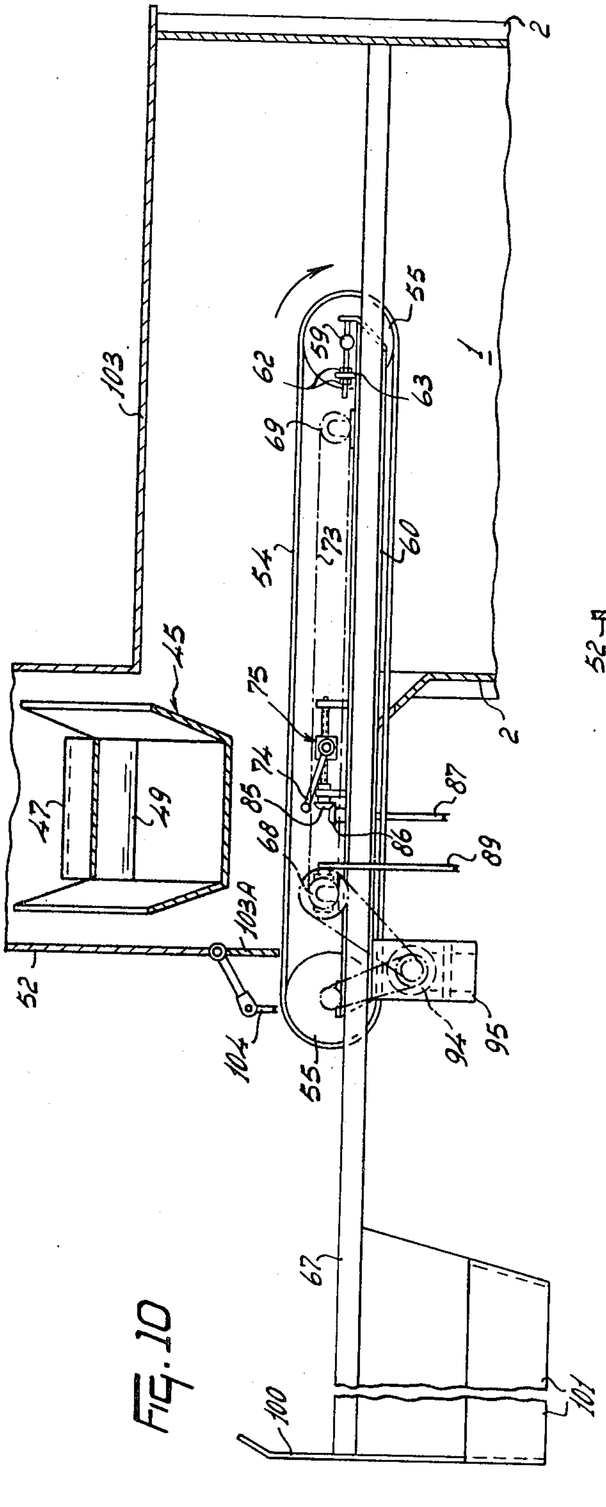
FIG. 10 is a further view similar to FIGS. 7 and 9 but showing a position of the conveyor in which it is withdrawing from said chamber.

The elevator 45 conveys the crop which it receives upwardly alongside the outer surface of one of the side walls 2 of the chamber 1 and discharges the crop through the bottom of the housing 52 and onto the upper transverse conveyor 51. The endless belt 54 of the conveyor 51 is driven from the electric motor 94 by way of the intermediate transmission members that have been described above so that said belt moves around the rollers 55 in the direction of the arrows that are shown in FIGS. 5 and 7 of the drawings. The figures of the drawings which have just been mentioned show one position of the supporting structure 64 of the conveyor 51 and, during the operation of the device, said supporting structure 64 and the conveyor 51 move to the right as seen in FIG. 7 of the drawings from the position illustrated in that figure. This is due to the arrangement of the endless member that is afforded by the chain 73 which chain, it will be recalled, is effectively anchored at one point, this point being at one end of the lower run of the chain 73 as shown in FIG. 8 of the drawings. The positively rotating sprocket wheel 68 causes the lower run of the chain 73 which is retained by the operating arm 74 of the reversing mechanism 75 to run around that sprocket wheel until the conveyor 51 and its supporting structure 64 arrive at a position just beyond that shown in FIG. 9 of the drawings in which one end of the conveyor 51 is approaching the side wall 2 of the chamber 1 remote from the side wall thereof adjoining the elevator 45. At this time, the anchorage point of the chain 73 will move into the upper run thereof and reversal of the direction of movement of the conveyor 51 and its supporting structure 64 takes place, those parts commencing to move out of the chamber 1 as shown in FIG. 10 of the drawings. Throughout this reciprocation of the conveyor 51 and its supporting structure 64 into, and out of, the drying chamber 1, the belt 54 of that conveyor 51 continues to rotate around the rollers 55 so that there is no interruption in delivery of crop from the conveyor 51. The cranked spindle 87 can be employed to move the travelling block 82 lengthwise along the rod 83 with a consequent change in the positions at which reversals of the change of direction of movement of the conveyor 51 and its supporting structure 64 into, and out of, the chamber 1 take place. Such adjustments may be made for optimum operation of the device with different types and quantities of crop but it will be noted that, whatever adjustment is employed, the conveyor 51 delivers crop back into the chamber 1 continuously in small but uniform quantities throughout substantially the whole of the effective width of said chamber. This effect is produced by the combined rotation and simultaneous bodily reciprocation of the conveyor 51.

Figure 11:
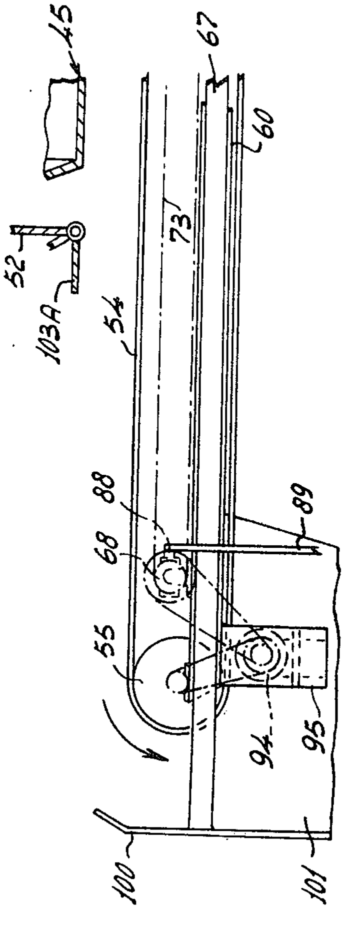
FIG. 11 is an elevation as seen in the same direction as FIGS. 7, 9 and 10 and shows a discharge position of the conveyor.

The crop which falls from the delivery end of the reciprocating conveyor 51 during the use of the device falls back onto the endless conveyor 14 at substantially the floor level of the chamber 1 and at an end region thereof which is very close to the front of the chamber. The slowly but continuously moving conveyor 14 transports that crop back towards the discharge or dosing mechanism 35, it being remembered that drying air passes continously upwards through and over crop within the chamber 1 during this circulatory movement. When circulation has taken place for a sufficiently long time to bring the crop to its required low moisture content, the toothed coupling 88 is operated by the control member 89 to discontinue drive to the shaft 71. This operation is undertaken at an instant at which the reciprocating conveyor 51 and its supporting structure 64 are at their position of maximum withdrawal from the chamber 1 as shown in FIG. 11 of the drawings. The electric motor 94 comprises a reverse control (not illustrated) and this is employed to cause the belt 54 of the conveyor 51 to move in the opposite direction that is indicated by an arrow in FIG. 11 of the drawings. The control rod 104 is also operated to tilt the flap 103 A upwardly into the position shown in FIG. 11 and, with this arrangement, crop delivered onto the conveyor 51 from the elevator 45 is fed into the upper end of the funnel 101 which funnel is in communication with the inlet of a branch duct 144 (FIG. 1) so that the crop can be blown by air delivered from the blower 131 along suitable ducting into a storage bin or other store. The branch duct 144 is connected to the duct 130 in such a way that communication therebetween may be opened while communication of the duct 130 with the air chamber 129 is closed so that the blower 131 will supply air only to the chamber 129 or the branch duct 144. It is also possible to arrange for the blower 131 to supply air to both the chamber 129 and the branch duct 144 at the same time.

Figure 12:
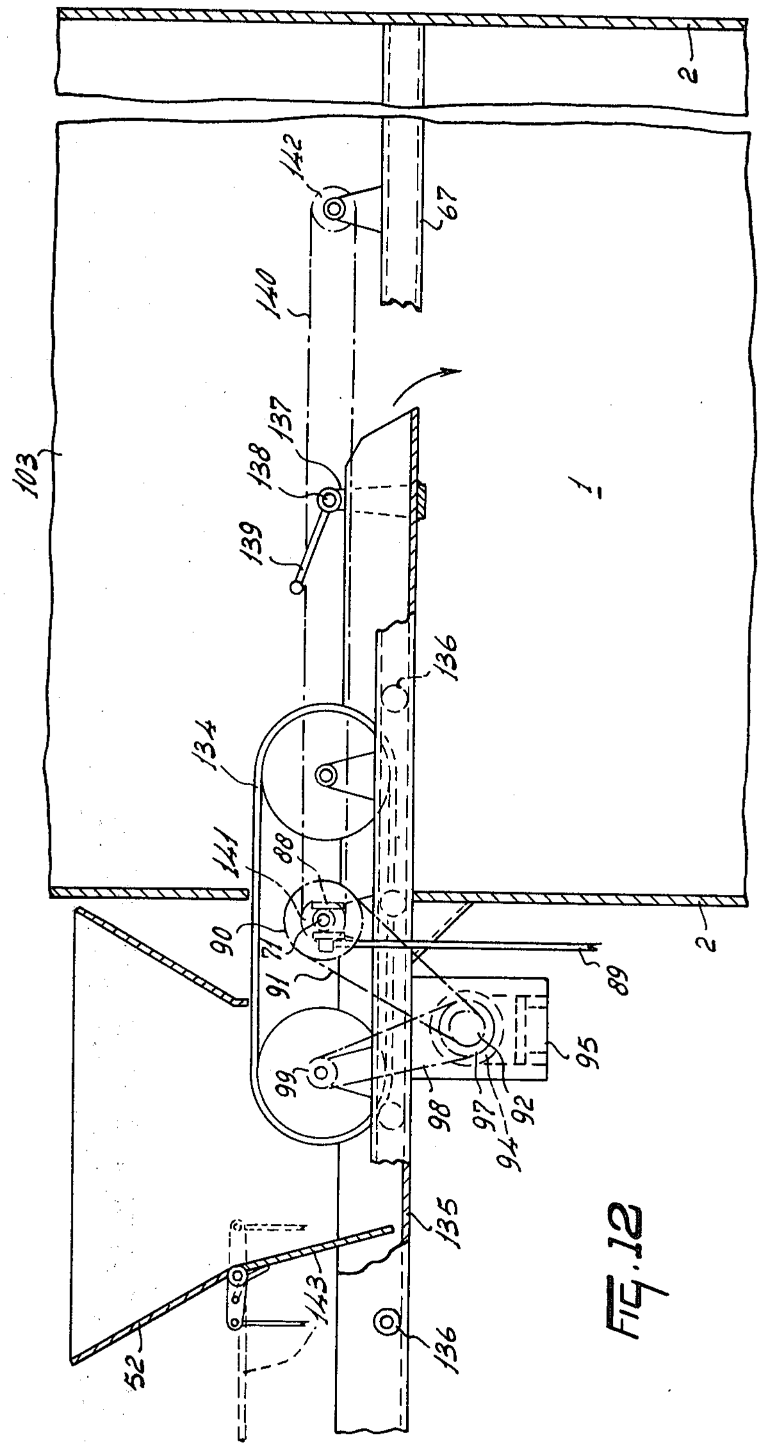
FIG. 12 is a part-sectional elevation illustrating an alternative construction and arrangement of the conveyor.

FIG. 12 of the drawings illustrates a modification in which an endless conveyor 134 is rigidly mounted on the guides 67 instead of being reciprocable therealong as is the endless conveyor 51. The endless conveyor 134 is otherwise similar to the previously described conveyor 51 except that it is of considerably shorter effective length. A horizontal plate 135 extends beneath the conveyor 134 and is held in the guides 67 by a series of freely rotatable rollers 136 that are arranged in said guides. The end of the plate 135 that is in the chamber 1 as illustrated in FIG. 12 of the drawings is provided with a support 137 to which an arm 139 is pivotably connected by a shaft 138. The opposite end of the arm 139 is pivotally connected to a link of an endless transmission chain 140 which affords the endless member in this embodiment. The chain 140 extends around sprocket wheels 141 and 142 and the relative dispositions of said sprocket wheels and the indirect connection point of the plate 135 to the chain 140 are such that the end of the plate 135 which is located inside the chamber 1 reciprocates to and fro throughout substantially the whole of the width of that chamber along the guides 67, assisted by the rollers 136. This reciprocatory movement takes place as soon as the chain 140 is driven in the same manner as has been described above for the chain 73. In this embodiment, crop is fed from the bottom of the housing 52 onto the top of the reciprocatory plate 135 and is moved between that plate and the lower run of the overlying endless conveyor 134, a guide flap 143 that is spring-loaded into the position thereof that is shown in FIG. 12 of the drawings being provided to ensure that the supplied crop reaches the required location on top of the plate 135. The endless conveyor 134 pushes crop to the right along the plate 135 as seen in FIG. 12 of the drawings and the reciprocating plate 135 ensures that the crop is delivered back to the conveyor 14 at the foot of the chamber 1 in a substantially uninterrupted manner and uniformly throughout substantially the whole of the effective width of that conveyor. When sufficient circulation of the crop through the device has taken place, the control member 89 is operated to disconnect the toothed coupling 88 and stop drive to the chain 140 and thus to the plate 135. This is done at an instant at which the plate 135 is at its position of maximum withdrawal from the chamber 1 and, subsequently, the drive to the conveyor 134 is reversed and the flap 143 is raised to the position thereof that is shown in broken lines in FIG. 12 of the drawings. Crop reaching the plate 135 from the housing 152 is then delivered out of the device in a similar manner to that which has already been described with reference to FIG. 11 of the drawings.

Although various features of the crop treatment device that has been described and/or that is illustrated in the accompanying drawings will be set forth in the following claims as inventive features, it is emphasized that the invention is not necessarily limited to those features and that it includes within its scope each of the parts of the crop treatment device and the modification that has been described and/or that is illustrated in the accompanying drawings both individually and in various combinations.

What we claim is:

1. A crop drier comprising a substantially enclosed drying chamber having an entrance, an exit and means for supplying heat to said chamber, a conveyor system comprising means in said chamber for moving crop in a first direction for moving crop along the length of said chamber and from said entrance to said exit, said system including movable conveyor means supported adjacent said entrance of said chamber, said conveyor said means being movable in a second direction transverse to said first direction relative to the width of said chamber at least in part within and in part outside said chamber proximate said entrance and being positioned to receive crop from another conveyor which is provided in said system substantially out of and along the side of said chamber to carry crop from said exit to said conveyor means, driving means connected to said conveyor means to move same in a horizontal reciprocating movement transverse to said first direction and deposit crop therefrom uniformly throughout substantially the entire width of said chamber.

2. A device as claimed in claim 1, wherein said conveyor means is located ajacent the upper side of said chamber.

3. A device as claimed in claim 2, wherein said conveyor means comprises an upper conveyor which is displaceably mounted relative to said chamber.

4. A device as claimed in claim 3, wherein said upper conveyor is mounted for reciprocating movements across the width of said chamber.

5. A device as claimed in claim 4, wherein said upper conveyor is an endless conveyor having an effective run in the same general direction in which that conveyor is recprocable.

6. A device as claimed in claim 5, wherein the length of the effective run of the upper conveyor is about equal to the width of said chamber.

7. A device as claimed in claim 5, including a supporting structure and at least one quide member on said conveyor means wherein the upper conveyor is mounted on said supporting structure which is movable horizontally relative to said guide member on said conveyor means.

8. A device as claimed in claim 7, wherein a transmission mechanism of said driving means is provided connected to the supporting structure to move same relative to said guide member, said transmission mechanism including a movable endless member.

9. A device as claimed in claim 8, wherein one part of said endless member is fixed with respect to a portion of said guide member.

10. A device as claimed in claim 9, wherein said endless member is located at one side of said supporting structure.

11. A device as claimed in claim 10, wherein said endless member extends in a substantially horizontal direction.

12. A device as claimed in claim 8, wherein there is a further guide member for said suppporting structure and said guide members are located at opposite sides of an opening in the top of said chamber.

13. A device as claimed in claim 12, wherein said two guide members are beams of channel-shaped cross-section and rollers provided in said supporting structure are received between the limbs of said beams.

14. A device as claimed in claim 13, wherein said rollers are located near opposite ends of said supporting structure.

15. A device as claimed in claim 8 including a single motor, wherein a first drive transmission is connected to said endless member and a second drive transmission is connected to said upper conveyor, each of said drive transmissions being in driving connection to said single motor.

16. A device as claimed in claim 15, wherein said second drive transmission is reversible.

17. A device as claimed in claim 2, wherein said conveyor means includes an endless upper conveyor and a movable part that is displaceable relative to said upper conveyor, said upper conveyor being positioned to co-operate with said part to move crop and deposit same across the width of said chamber.

18. A device as claimed in claim 17, wherein said movable part is displaceable in a direction transverse to the length of said chamber.

19. A device as claimed in claim 18, wherein said movable part is displaceable a distance substantially equal to the width of said chamber.

20. A device as claimed in claim 19, wherein said movable part is located beneath said upper conveyor.

21. A device as claimed in claim 20, wherein said movable part is connected to a drive mechanism that reciprocates said part relative to the upper conveyor.

22. A device as claimed in claim 21, wherein said drive mechanism comprises an endless chain and said movable part is pivotally coupled to said endless chain.

23. A device as claimed in claim 22, wherein said movable part is a plate.

24. A device as claimed in claim 23, wherein the effective length of said movable part substantially corresponds to the width of said chamber.

25. A device as claimed in claim 1, wherein said conveyor means includes an upper conveyor that has endless belt means, a portion of said conveyor means being reciprocable in a direction transverse to the length of said chamber, said driving means including an endless chain that is connected to said portion of the conveyor means to reciprocate same back and forth.

26. A device as claimed in claim 25, wherein said chain is passed around two spaced apart sprocket wheels which comprise components of said driving means.

27. A device as claimed in claim 26, wherein one of said sprocket wheels is a driven sprocket wheel.

28. A device as claimed in claim 27, wherein said driven sprocket wheel is positioned remote from the center of said chamber relative to the other sprocket wheel.

29. A device as claimed in claim 25 including a discharge mechanism wherein said conveyor system comprises an endless floor conveyor at the bottom of said chamber, said floor conveyor being arranged to feed crop within the chamber to said discharge mechanism located adjacent the rear end of said chamber, said discharge mechanism being positioned to feed crop out of said exit.

30. A device as claimed in claim 29, wherein said floor conveyor is connected to said driving means which is adapted to drive same at different speeds.

31. A device as claimed in claim 29, wherein said discharge mechanism comprises a lifting conveyor, one run of which is inclined to the vertical.

32. A device as claimed in claim 25, wherein a heating system including a blower and a hot air duct is connected to said chamber to introduce heat into said chamber through its floor.

33. A device as claimed in claim 25, wherein a trough for receiving dirt, dust and like undesirable material from said chamber is secured to the bottom of the chamber at the front thereof.

34. A device as claimed in claim 33, wherein said trough has an auger that is turnable to carry away said undesirable material.

35. A device as claimed in claim 25, wherein said driving means comprises a reversible motor connected selectively to move said belt means in either of two directions, said belt means being movable selectively carry to treated crop out of said chamber.

36. A crop drier comprising an elongated drying chamber having an entrance and an exit for crop, a conveyor system for moving crop along the length of said chamber from said entrance to said exit, said system including a floor conveyor and a discharge mechanism for moving crop out of said chamber and to an upper transverse conveyor assembly provided at the side of said entrance adjacent the upper side of said chamber, a support structure included in said assembly mounted therein adapted for reciprocal movement across substantially the width of said chamber in directions tranverse to the direction of movement of said floor conveyor, said assembly including endless belt means on said supporting structure, driving means connected to said supporting structure and said belt means adapted to move each of same, crop received by said assembly being carried and moved by said belt means and being deposited thereby within and across the width of said chamber.

37. A device as claimed in claim 36, wherein a transmission mechanism of said driving means is connected to said supporting structure to move same relative to a horizontal guide, provided across said chamber to guide the reciprocating movement thereof, said transmission mechanism including a movable endless member, one part of said endless member being fixed with respect to a portion of said guide, said one part of said endless member being linked to said guide at a level between the upper and lower sides of said endless member, said connection moving said belt means whereby it reciprocates in synchronization therewith from one run of the endless member to the other run.

38. A device as claimed in claim 37, wherein said endless member is located at one side of said supporting structure, extends in a substantially horizontal direction and is driven from one end thereof.

39. A device as claimed in claim 37, wherein said connection is a part of a reversing mechanism that repeatedly changes direction of movement of said belt means during operation thereby causing its reciprocating movements an adjusting device being connected to said reversing mechanism and said connection, said adjusting device being movable relative to said guide.

40. A device as claimed in claim 39, wherein said reversing mechanism comprises an operating arm which is pivotally connected to both said guide and said endless member, one end of said operating arm being connected to said guide and being displaceable in the normal direction of movement of said endless member.

41. A device as claimed in claim 40, wherein said one end of the operating arm is connected to a travelling member which is displaceable relative to said guide.

42. A device as claimed in claim 41, wherein said travelling member cooperates with a rotary screwthreaded shaft which comprises a component of said adjusting device, said shaft extending substantially parallel to said guide.

43. A device as claimed in claim 42, wherein one end of said shaft has a bevel pinion whose teeth are in driven mesh with those of a further bevel pinion carried by a downwardly directed cranked spindle of said adjusting device.

44. A device as claimed in claim 43, wherein the end of said operating arm remote from said guide, is pivotally connected to said endless member by spaced apart brackets.

45. A device as claimed in claim 39, wherein said reversing, mechanism is located adjacent a side wall of said chamber.

46. A device as claimed in claim 37, wherein there is a further guide similar to said first mentioned guide for said supporting structure, said guides being located at opposite sides of an opening in the top of said chamber.

47. A device as claimed in claim 46, wherein said guides are beams of channel-shaped cross-section and rollers which comprise components of said supporting structure are received between the limbs of said beams, said rollers being located near opposite ends of said supporting structure.

48. A device as claimed in claim 37, wherein a first drive transmission is connected to said endless member and a second drive transmission is connected to said belt means, each of said drive transmissions being in driving connection to a single motor, said second drive transmission being reversible.

49. A device as claimed in claim 36, wherein said conveyor system comprises an endless floor conveyor at the bottom of said chamber, said floor conveyor being arranged to feed crop within the chamber to said discharge mechanism which is located adjacent the rear end of said chamber, said discharge mechanism being positioned to feed crop out of said exit.

50. A device as claimed in claim 49, wherein said discharge mechanism comprises a lifting conveyor, one run of which is inclined to the vertical.

51. A device as claimed in claim 50, wherein said lifting conveyor, when viewed in side elevation, is of substantially right-angled triangular configuration, an upper run of said lifting conveyor forming the figurative adjacent side of said triangle.

52. a device as claimed in claim 5, wherein an upwardly extending, figurative opposite side of said triangle faces the interior of said chamber and is substantially perpendicularly inclined to said floor conveyor at the bottom of the chamber.

53. A device as claimed in claim 52, wherein the figurative hypotenuse side of said triangle is spaced from the interior of said chamber and is located above a lower transverse conveyor provided as a component of said discharge conveyor, said lower transverse conveyor being located beyond the end of said floor conveyor and supported at substantially the same level as the bottom of said chamber, said lower transverse conveyor projecting laterally beyond said chamber.

54. A device as claimed in claim 53, wherein an elevator conveyor provided as a component of said discharge conveyor extends between said lower transverse conveyor and said upper transverse conveyor located at the top of said chamber.

55. A device as claimed in claim 54, wherein said elevator conveyor extends along the outer surface of an upright side wall of said chamber.

56. A device as claimed in claim 54, wherein a safety mechanism is mounted adjacent said elevator conveyor adapted to switch off the drive to said lower transverse conveyor in the event an overload of crop is supplied to said elevator conveyor.

57. A device as claimed in claim 56, wherein said safety mechanism comprises pivotable rods which extend in the path of crop movement, said rods being deflectable to open a switch in said safety mechanism when a crop overload exists during operation.

58. A device as claimed in claim 36, wherein a heating system including a blower and a hot air duct is connected to said chamber which is adapted to introduce heated gases into said chamber through its floor.

59. A device as claimed in claim 36, wherein a trough for receiving dirt, dust and like undesirable material from said chamber is secured to the bottom of the chamber at the front thereof immediately forward of said floor conveyor.

60. A device as claimed in claim 59, wherein said trough is provided an auger therein which is turnable whereby it carries undesired material from said chamber.

61. A device as claimed in claim 36, wherein said driving means comprises a reversible motor connected selectively to move said belt means in either of two directions, said belt means being adaptable to move treated crop out of said chamber from said discharge conveyor.

62. A crop drier comprising an elongated drying chamber having an entrance and an exit for crop at the shorter ends thereof, a conveyor system for moving crop along the length of said chamber from said entrance to said exit, said system including a floor conveyor, an upper transverse conveyor assembly and a further conveyor for moving crop above said floor conveyor to said upper transverse conveyor assembly, a portion of said assembly being mounted for reciprocal movement within said chamber in a horizontal direction substantially perpendicular to the direction of movement of said floor conveyor, said portion including endless belt means, driving means connected to said portion and to said belt means to move each of same, whereby crop received by said assembly is moved by said reciprocating belt means and deposited within said chamber across the width of same, control means connected to said assembly to disconnect said driving means from said portion and prevent reciprocal movement of same, said control means being connected to reverse the direction of movement of said belt means for discharging crop from the drier.

63. A crop drier comprising a drying chamber having an entrance, an exit and means for supplying heat to said chamber, a conveyor system for moving crop along the length of said chamber and from said entrance to said exit, said system including movable conveyor means supported adjacent one end of said chamber, said conveyor means being movable relative to the width of said chamber and being positioned to receive crop from another conveyor of said system, driving means connected to said conveyor means to move same and deposit crop uniformly throughout substantially the entire width of said chamber, said conveyor means being located ajdacent the upper side of said chamber and comprising an upper conveyor which is displaceably mounted relative to said chamber for reciprocating movements across the width of said chamber, said upper conveyor being an endless conveyor having an effective run in the smae general direction in which said upper conveyor is reciprocable, said upper conveyor being mounted on supporting structure which is movable horizontally relative to at least one guide member on said conveyor means, a transmission mechanism of said driving means being connected to said supporting structure to move same relative to said guide member, said transmission mechanism including a movable endless member, one part of said endless member being fixed with respect to a portion of said guide member, said one part of said endless member being linked to said guide member portion between the connection of the upper and lower runs of said endless member and the reciprocal movements of said upper conveyor being synchronized so that said connection moves from one run of said endless member to the other said run.

64. A device as claimed in claim 63, wherein said endless member is driven from one end thereof.

65. A device as claimed in claim 63, wherein said connection is a part of a reversing mechanism adapted repeatedly change direction of movement of said upper conveyor during operation thereof.

66. A device as claimed in claim 65, wherein an adjusting device is provided which is connected to said reversing mechanism and said connection is movable relative to said guide.

67. A device as claimed in claim 66, wherein said reversing mechanism comprises an operating arm which is pivotally connected to both said guide and said endless member.

68. A device as claimed in claim 67, wherein one end of said operating arm is connected to said guide and is displaceable in the normal direction of movement of said endless member.

69. A device as claimed in claim 68, including an adjusting device having a travelling member wherein said one end of the operating arm is connected to said travelling member which is displaceable relative to said guide.

70. A device as claimed in claim 69, wherein said adjusting device includes rotary screw threaded shaft and said travelling member co-operates with a rotary screwthreaded shaft of said adjusting device.

71. A device as claimed in claim 70, wherein said shaft extends substantially parallel to said guide.

72. A device as claimed in claim 71, wherein one end of said shaft has a bevel pinion having teeth in driven mesh with those of a further bevel pinion which is carried by a downwardly drected cranked spindle included in said adjusting device.

73. A device as claimed in claim 72 including spaced apart brackets wherein the end of said operating arm remote from said guide, is pivotally connected to said endless member by said spaced apart brackets.

74. A device as claimed in claim 65, wherein said reversing mechanism is located adjacent a side wall of said chamber.

75. A crop drier comprising a drying chamber having an entrance, an exit and means for supplying heat to said chamber, a conveyor system for moving crop along the length of said chamber and from said entrance to said exit, said system including movable conveyor means supported adjacent one end of said chamber, said conveyor means being movable relative to the width of said chamber and being positioned to receive crop from another conveyor of said system, driving means connected to said conveyor means to move same and deposit crop uniformly throughout substantially the entire width of said chamber, said conveyor means including an upper conveyor which has endless belt means, a portion of said conveyor means being reciprocable in a direction transverse to the length of said chamber, said driving means including an endless chain which is connected to said portion of said conveyor means to reciprocate same back and forth, said conveyor system comprising an endless floor conveyor at the bottom of said chamber, said floor conveyor being arranged to feed crop within said chamber to a discharge mechanism located adjacent the rearend of said chamber, said discharge mechanism being positioned to feed crop out of said exit, said discharge mechanism comprising a lifting conveyor, one run of which is inclined to the vertical, said lifting conveyor, when viewed in side elevational, being substantially right-angled triangular configuration, an upper run of said lifting conveyor forming the figurative adjacent side of said triangle.

76. A device as claimed in claim 75, wherein an upwardly extending, figurative opposite side of said triangle faces the interior of said chamber and is substantially perpendicularly inclined to the lifting conveyor at the bottom of the chamber.

77. A device as claimed in claim 76, including a lower transverse conveyor wherein the figurative hypotenuse side of said triangle is spaced from the interior of said chamber, and is located above said lower transverse conveyor supported at substantially the same level as the bottom of said chamber, said lower transverse conveyor projecting laterally beyond said chamber.

78. A device as claimed in claim 77, wherein an elevator conveyor is provided to extend between said lower transverse conveyor and said upper conveyor located at the top of said chamber.

79. A device as claimed in claim 78, wherein said elevator conveyor extends along the outer surface of an upright side wall comprising a component of said chamber.

80. A device as claimed in claim 78, wherein a safety mechanism is mounted adjacent said elevator conveyor to switch off the drive to said lower transverse conveyor in the event an overload of crop is supplied to said elevator conveyor.

81. A device as claimed in claim 80, wherein said safety mechanism comprises a controlling switch and pivotable rods which extend in the path of crop movement and said rods are deflectable to open said switch when a crop overload exists during operation.

* * * * *